United States Patent
Szilagyi et al.

(10) Patent No.: US 8,503,875 B2
(45) Date of Patent: Aug. 6, 2013

(54) FLUIDIC VIEWFINDER DEVICE

(75) Inventors: Andrei Szilagyi, Danville, CA (US); Robert G. Batchko, Albuquerque, NM (US)

(73) Assignee: Holochip Corporation, Albuquerque, NM (US)

( * ) Notice: Subject to any disclaimer, the term of this patent is extended or adjusted under 35 U.S.C. 154(b) by 900 days.

(21) Appl. No.: 12/620,503

(22) Filed: Nov. 17, 2009

(65) Prior Publication Data

US 2010/0128358 A1 May 27, 2010

Related U.S. Application Data

(60) Provisional application No. 61/115,459, filed on Nov. 17, 2008.

(51) Int. Cl.
*G03B 13/02* (2006.01)
*G03B 13/10* (2006.01)
*G02B 1/06* (2006.01)

(52) U.S. Cl.
USPC ............ 396/373; 396/378; 359/665; 348/341

(58) Field of Classification Search
USPC .................... 396/373, 378, 379; 348/333.09, 348/341; 359/665–666
See application file for complete search history.

(56) References Cited

U.S. PATENT DOCUMENTS

| 2,300,251 | A | * | 10/1942 | Flint | 359/665 |
| 4,466,706 | A | * | 8/1984 | Lamothe, II | 359/666 |
| 4,514,048 | A | * | 4/1985 | Rogers | 359/676 |
| 7,405,884 | B2 | * | 7/2008 | Nishioka et al. | 359/665 |
| 7,697,214 | B2 | * | 4/2010 | Batchko et al. | 359/665 |
| 7,789,013 | B2 | * | 9/2010 | Silver | 92/136 |
| 8,027,096 | B2 | * | 9/2011 | Feng et al. | 359/666 |
| 8,064,142 | B2 | * | 11/2011 | Batchko et al. | 359/665 |
| 2006/0045501 | A1 | * | 3/2006 | Liang et al. | 396/62 |
| 2006/0050402 | A1 | * | 3/2006 | Ito et al. | 359/666 |
| 2009/0251792 | A1 | * | 10/2009 | Suzuki et al. | 359/666 |

* cited by examiner

*Primary Examiner* — Christopher Mahoney
(74) *Attorney, Agent, or Firm* — Joshua D. Isenberg; JDI Patent

(57) ABSTRACT

A fluidic viewfinder device may include a support member having an opening forming an aperture and a fluidic lens disposed at least partially in communication with the aperture and support member. The fluidic lens may comprise a first optical surface and a second optical surface, one or more of which includes an elastic membrane. A fluid may be enclosed in at least a portion of the fluidic lens. The optical properties of the fluidic lens may be changed by displacement of the fluid, e.g., due to movement of a slide member or a rotating yoke.

22 Claims, 4 Drawing Sheets

FLUIDIC VIEWFINDER DEVICE

CLAIM OF PRIORITY

This application claims the benefit of priority of U.S. Provisional Patent Application No. 61/115,459 filed Nov. 17, 2008, the entire contents of which are incorporated herein by reference.

CROSS-REFERENCE TO RELATED APPLICATIONS

This application is related commonly-assigned, application Ser. No. 12/602,592, to Andrei Szilagyi et al., entitled "FLUIDIC STABILIZED FOCUS DEVICE", filed the same day, as the present application, the entire disclosures of which are incorporated herein by reference.

This application is related to commonly-assigned U.S. Provisional Patent Application No. 60/987,498 filed Nov. 13, 2007 the entire contents of which are incorporated herein by reference.

This application is related to commonly-assigned U.S. Provisional Patent Application No. 60/987,493, to Robert G. Batchko et al., entitled "FLUIDIC STABILIZED FOCUS DEVICE", filed Nov. 13, 2007, the entire disclosures of which are incorporated herein by reference in its entirety.

This application is related to commonly-assigned U.S. Provisional Patent Application No. 61/115,456, to Robert G. Batchko et al., entitled "FLUIDIC STABILIZED FOCUS DEVICE", filed Nov. 17, 2008, the entire disclosures of which are incorporated herein by reference in its entirety.

This application is related to commonly-assigned U.S. Provisional Patent Application No. 61/171,044, to Robert G. Batchko et al., entitled "VARIABLE-FOCAL-LENGTH FLUIDIC LENS WITH REDUCED OPTICAL ABERRATION", filed Apr. 20, 2009, the entire disclosures of which are incorporated herein by reference in its entirety.

This application is related to commonly-assigned U.S. patent application Ser. No. 11/383,216, to Robert G. Batchko et al., entitled "FLUIDIC OPTICAL DEVICES", filed May 14, 2006, the entire disclosures of which are incorporated herein by reference in its entirety.

This application is related to commonly-assigned U.S. patent application Ser. No. 11/928,076, to Robert G. Batchko et al., entitled "FLUIDIC OPTICAL DEVICES", filed Oct. 30, 2007, the entire disclosures of which are incorporated herein by reference in its entirety.

This application is related to commonly-assigned U.S. patent application Ser. No. 11/928,216, to Robert G. Batchko et al., entitled "FLUIDIC OPTICAL DEVICES", filed Oct. 30, 2007, the entire disclosures of which are incorporated herein by reference in its entirety.

This application is related to commonly-assigned U.S. patent application Ser. No. 11/928,376, to Robert G. Batchko et al., entitled "FLUIDIC OPTICAL DEVICES", filed Oct. 30, 2007, the entire disclosures of which are incorporated herein by reference in its entirety.

This application is related to commonly-assigned U.S. patent application Ser. No. 11/747,845, to Robert G. Batchko et al., entitled "FLUIDIC LENS WITH ELECTROSTATIC ACTUATION", filed May 11, 2007 and published as United States Patent Application Publication 20070030573, the entire disclosures of both of which are incorporated herein by reference in its entirety.

This application is related to commonly-assigned U.S. patent application Ser. No. 12/117,625, to Robert G. Batchko et al., entitled "FLUIDIC LENS WITH MANUALLY-ADJUSTABLE FOCUS", filed May 8, 2008, the entire disclosures of which are incorporated herein by reference in its entirety.

FIELD OF THE INVENTION

This invention relates generally to optics. More particularly, it relates to fluidic optical devices.

BACKGROUND

Actuated fluidic lens structures are described in commonly owned U.S. provisional patent applications 60/680,832, 60/683,072, 60/703,837, 60/723,281, 60/747,181 and 60/916,739, which are incorporated herein by reference. Fluidic lens structures are also described in U.S. patent application Ser. No. 11/747,845 and United States Patent Application publication 20070030573 which are incorporated herein by reference. Other examples of fluidic lens structures are described in U.S. Pat. Nos. 7,072,086, 7,218,429 and 7,218,430, the disclosures of which are all incorporated herein by reference.

DETAILED DESCRIPTION

In the present document, additional inventive teachings are provided to expand the applicability of fluidic lenses.

Embodiments of the present invention are based on a fluid-filled chamber capable of squeezing an at least partially transparent fluid into a centrally-disposed elastic-membrane-delimited lens. Pressurization of the fluid causes the membrane to bulge, thereby controllably altering the optical power of the lens. The elastic energy of the membrane may provide the restoring force which prevails, allowing the membrane to return to its unstressed (or unactuated) state once the actuating force is diminished. This approach to adjusting optical power may also be applied to the embodiments of the present invention that are described below.

Figure 1:
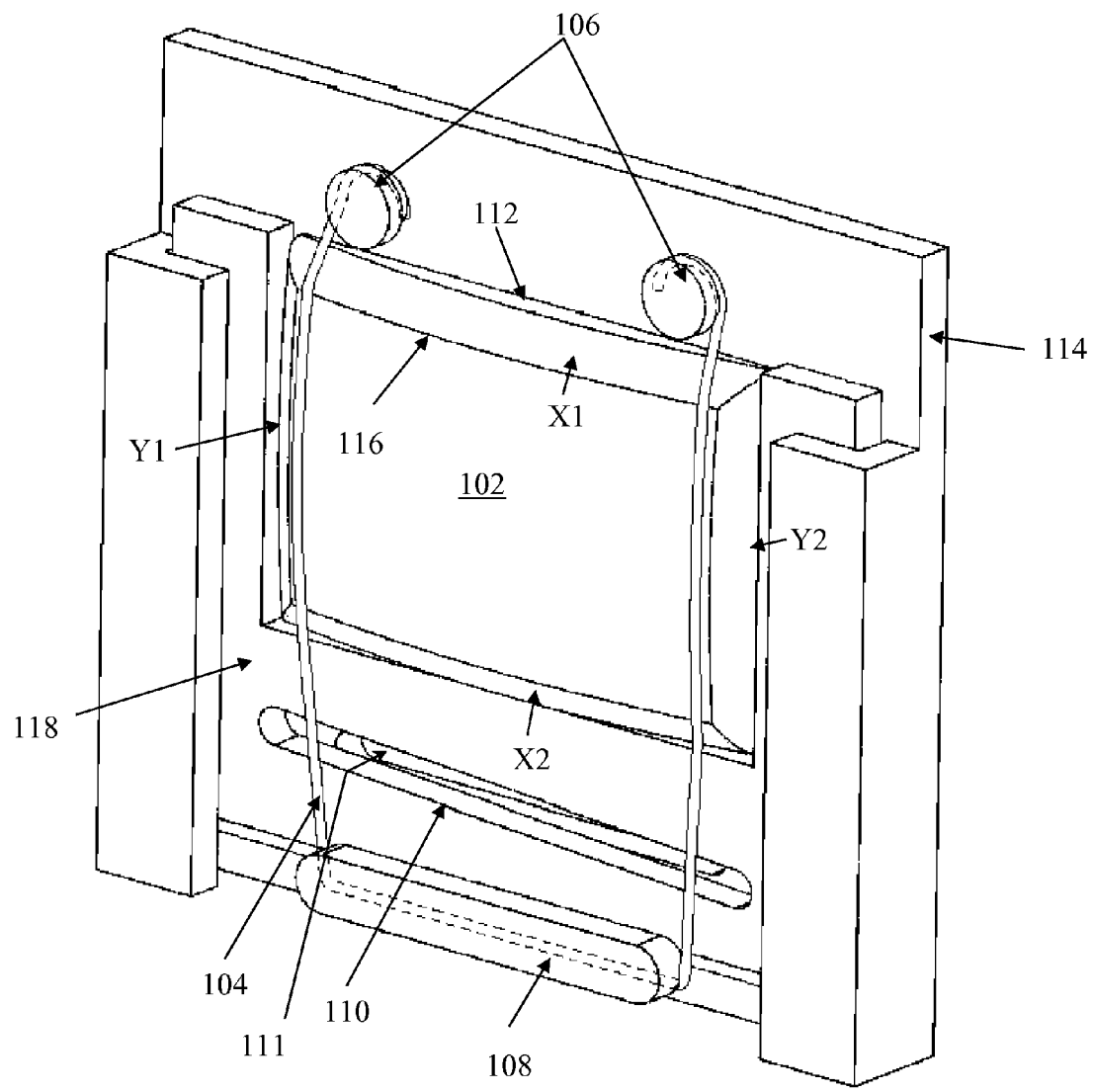
FIG. 1 is a perspective view of a fluidic viewfinder device according to an embodiment of the present invention.

An embodiment of a fluidic viewfinder device 100 according to an embodiment of the present invention is depicted in FIG. 1. Viewfinders are commonly used in optical devices such as single-lens reflex (SLR) cameras and camcorders. In conventional viewfinders, a static focusing lens is caused to travel axially to adjust focus. In embodiments of the present invention, in a fluidic viewfinder device a fluidic lens can replace the axially traveling lens of the conventional viewfinder. Unlike other applications of fluidic lenses, such as autofocus and zoom lenses and applications described in the commonly owned applications referred to above, adjustable-focus (or fluidic) lenses for viewfinders tend to have modest requirements for both imaging accuracy (or wavefront errors) and range of focal power (or Diopter range). The relaxed requirements for viewfinders are primarily due to the ability of the human eye and mind to compensate for image distortion and the relatively small Diopter range (approximately 15

Diopters or less) required to bring the viewfinder image into focus for the user (thereby compensating for limitations in the accommodation of the eye of the user). A reduced symmetry lens is therefore possible for viewfinder applications.

By way of example in FIG. 1, a fluidic viewfinder device 100 includes a fluidic lens 102. Fluidic lens 102 may have a substantially rectangular outline (or format or perimeter). The outline of fluidic lens 102 may extend beyond an aperture 112 in a support member 114. Fluidic lens 102 may generally comprise a fluid-filled volume that includes at least one transparent elastic membrane 116 as one of its boundaries. The fluid filling the fluidic lens 102 may be at least partially transparent or transmissive at a given range of wavelengths as understood in the art. Examples of suitable fluids and materials for the membrane are described, e.g., in United States Patent Application publication 20070030573, which was incorporated herein by reference above.

A band 104 comprised of relatively un-stretchable fibers overlaps portions of the membrane 116 that are occluded by opaque portions of the support member 114. The band 104 may be arranged to link features 106 of the support member 114 with one or more hook-shaped projections 108 on a sliding component ("slide member") 118. Movement of the slide member 118 is designed to cause the band 104 to either become more taut or slack (or change the tension of the band 104) depending on the direction that the slide member is moved (sliding direction). The slide member 118 may also include a slot feature ("slide member slot") 110, which may be in partially overlapping relationship with a corresponding slot 111 in the support member 114 ("support member slot"). By way of example, and not by way of limitation, the support member slot 111 may be oriented at a right angle to the sliding direction, while the slide member slot 110 may form a shallow angle with respect to the support member slot 111. The slide member 118 may be manually actuated by means of a sliding pin member (not shown) adapted to pass through both the slide member slot 110 and support member slot 111. The axis of the pin member may be perpendicular to the planes of both the slide member and support member, while the movement of the pin member may be along the direction of the support member slot 111. This movement of the pin member may cause the slide member 118 to advance or recede based on the well-known operation of an inclined plane. In this fashion, frictional forces are created between pin, slide member slot 110, support member slot 111 and between the edge of the slide member 118 and the support member 114. The angle between the slide member slot 110 and support member slot 111 is preferably sufficiently shallow so that the frictional forces are sufficient to prevent the tension in the band 104 from driving the pin member toward relaxation.

In operation, the user may slide member 118 (or adjust) the pin member sideways while looking through the device in a fashion typical for traditional viewfinders. The resulting tensioning of the band 104 adjusts the pressure on the lens membrane 116 causing it to modify its curvature and optical power as a result of displacement of fluid within the enclosed volume that forms the lens 102. When the desired focus (or focal power) of the device is obtained, the user may stop moving the pin, which may remain in its position due to frictional forces.

It is contemplated that the lens membrane 116 may be formed or molded as a substantially rectangular section of a curved shape. The curvature of the rectangular section may be generally spherical, aspherical, or comprise other curved shapes such as cylindrical shapes. Such a molding operation may allow the introduction of additional optical correction features (or corrective optical elements) such as aspherical correction or aspheric surfaces, typically introduced in more expensive optical elements.

Optical distortion may be reduced by several methods. As one possible method of reducing optical distortion, one or more sides of the lens outline (or perimeter) X1, X2 of the fluidic lens 102 (for example, the longer sides) may be substantially fixed or rigid. Likewise, one or more sides of the lens outline Y1, Y2 of the fluidic lens 102 (for example, the more distant or narrow sides) may be substantially compliant or free to move. In this fashion, fluid disposed in the proximity to the free sides Y1, Y2 may be caused to move (or displaced) by the action (or changing of tension) of the band 104 or movement of the slide member 118. Likewise, fluid disposed in the proximity to the fixed sides X1, X2 may experience less displacement by the action of the band 104 or movement of the slide member 118. This arrangement of boundary conditions may help minimize optical distortion in the device, although some amount of distortion may be generally acceptable similar to that which can be tolerated in conventional viewfinders.

In the related patent applications referred to in the Background section above, it has been disclosed that one or both sides (or optical surfaces) of a fluidic lens may be actuated (or elastically deformed) to provide a change in optical properties. In the case where only one surface actuated, the other (i.e., non-actuated) surface may include an optical window, static lens or other optical element. This is also true for embodiments of the instant invention. Specifically, the elastic membrane 116 may form a first refractive surface of the lens 102 while a rigid window or static lens may provide a second refractive surface. Transparent fluid may be enclosed between the two refractive surfaces and the support member 114. Such configuration may afford an additional degree of integration, wherein the window or static lens and the support member 114 may be fabricated in the same two-shot molding operation. Such integration may help reduce the cost of the device. Since the focusing lens is not required to substantially travel axially to adjust focus (as in the case of a conventional viewfinder), another benefit of the invention may be the reduction in the space required by the device compared to conventional viewfinders. Consequently, the entire package for a camera implementing a fluidic viewfinder device may shrink, resulting in potential reduction in weight, form factor, size or complexity.

Figure 2:
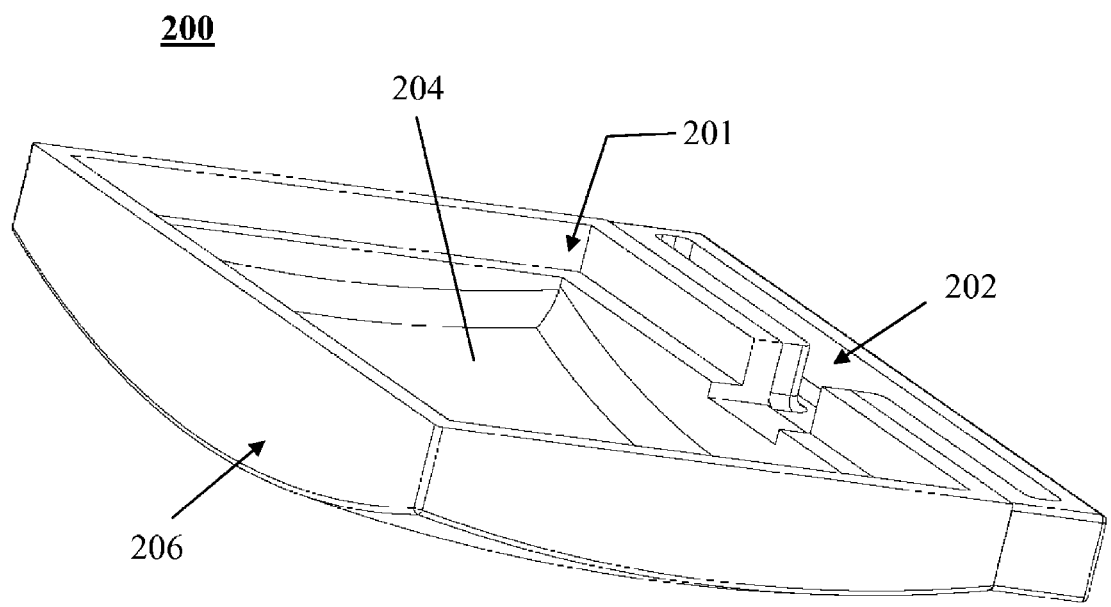
FIG. 2 is a perspective view of a rectangular fluidic lens with adjoining reservoir compartment according to a second embodiment of the present invention.
Figure 3:
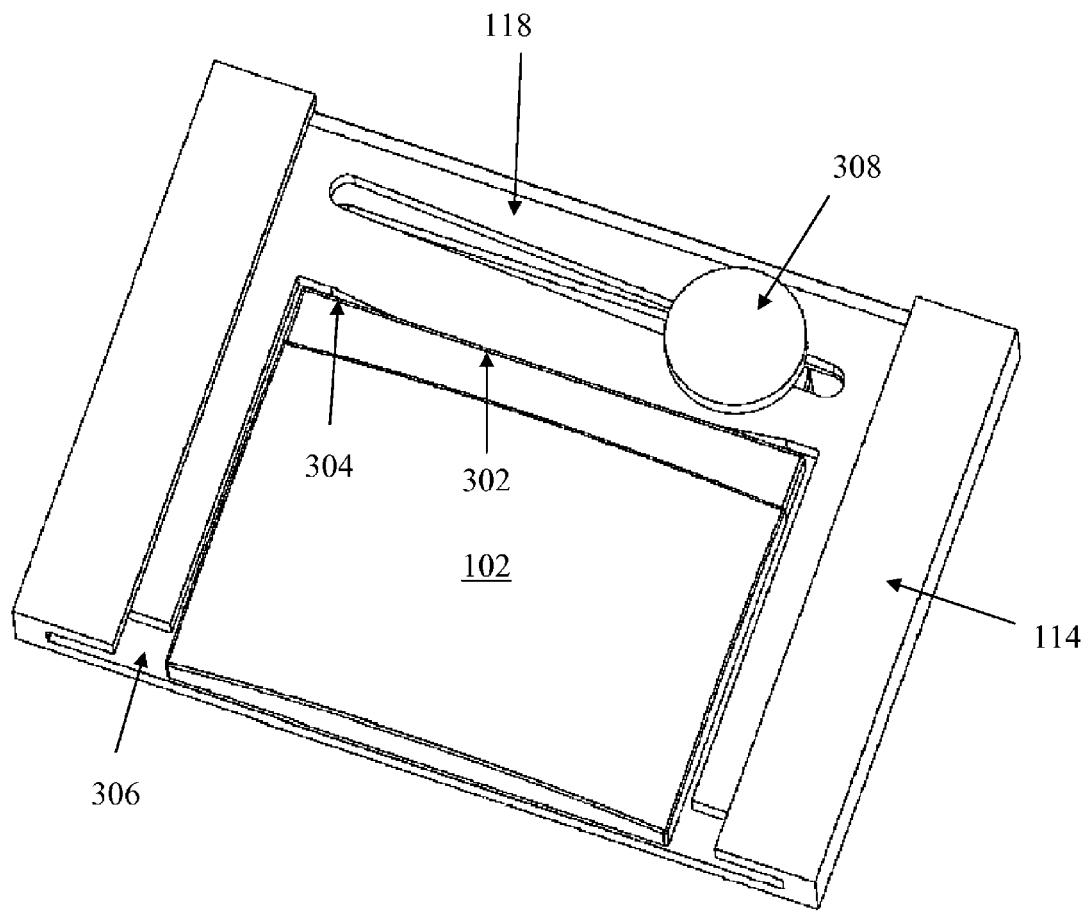
FIG. 3 is a perspective view of a side reservoir compartment of the second embodiment of the present invention.

FIG. 2 and FIG. 3 show another embodiment of the present invention. FIG. 2 shows a fluidic lens 200 having a main fluid compartment 201 and reservoir compartment 202 in fluid communication with an enclosed volume (or "main fluid compartment") 204 that forms the fluidic lens 200. The fluidic lens 200 may include a transparent elastic membrane 206 to provide as at least one of the boundaries of the enclosed fluid volume. By way of example, and without limitation, reservoir compartment 202 may be formed by or include a distinct compartment in fluid communication with the main fluid compartment 206 of the lens 200. Alternatively, the main fluid compartment 201 and reservoir compartment 202 may be separated by a compliant wall (not shown) wherein both compartments may be filled with an incompressible fluid (or gel or polymer). In this fashion, changes in pressure, or fluid displacement, may be communicated between the two compartments by deformation of the compliant wall. Note that for convenience of illustration, the back wall of each compartment is not shown.

In this embodiment, movement (or displacement) of fluid from the reservoir compartment 202 to the main fluid volume 204 or vice versa may cause a change in curvature (or deformation or elastic deformation) of the elastic membrane 206. This change in curvature may result in a change in the focusing properties of fluidic lens 200. As shown in FIG. 3, to actuate the device and create the movement of fluid, an edge 302 of a slide member 306 may impinge on a side wall 304 of the reservoir compartment 202. The edge 302 of the slide 306 may be configured (for example, with a curved surface) in a fashion such that it can interact mainly with a compliant section (for example, in the middle) of the reservoir compartment 202. In other embodiments, the slide member 118 may impinge on or be in communication with one or more compliant walls of the main fluid compartment. The slide member X, in turn, may be actuated in a manner similar to that of the first embodiment described above. For example, slide member 118 may include a knob member 308, a pin member (not shown), or another actuator as understood in the art. In this fashion, slide member 118 may be actuated by sliding knob member 308 sideways (or along or parallel to a sliding axis or direction). Although this embodiment may have reduced symmetry compared to that of the previous embodiment, it may benefit from a more simple construction, for example, by not requiring a band or features (for example, a hook member) for anchoring the band.

Figure 4:
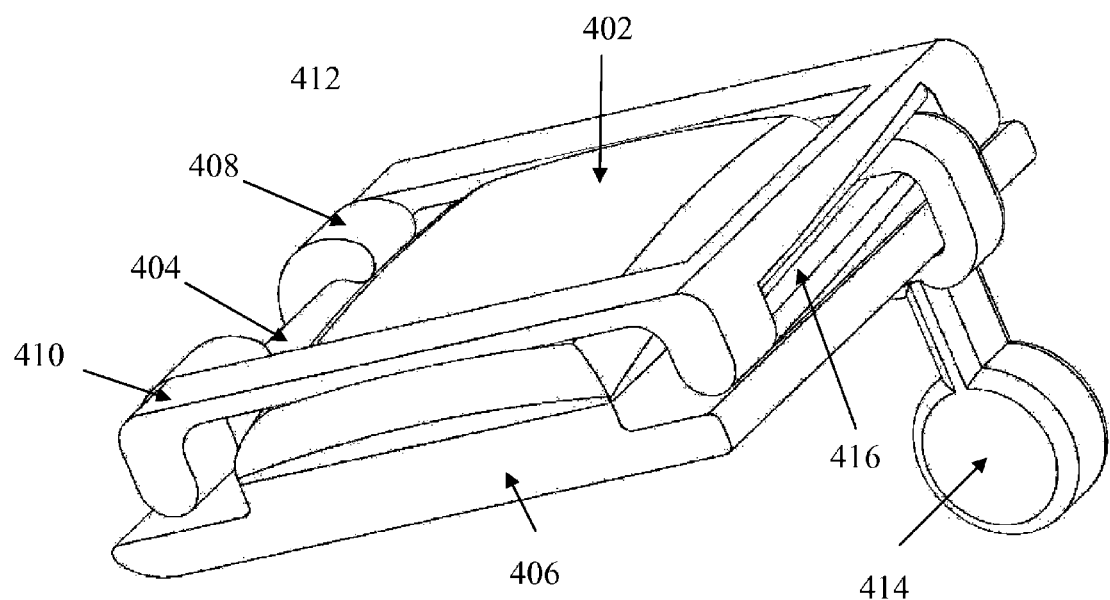
FIG. 4 is a perspective view of a fluidic viewfinder according to a third embodiment of the present invention.

FIG. 4 shows a third embodiment of the present invention. In this embodiment, a fluidic lens may include a membrane 402 that provides a boundary of a fluid-filled volume. The membrane 402 is coupled to a support member 406 and with two sides (or other portions) of a hinged, frame-like yoke 404. The yoke 404 may be pivotally attached to a support member 406 by a hinge 408. The hinge 408 may rotationally couple the yoke 404 to the support member 406 such that the yoke may rotate about an axis proximate to an end of the yoke. Openings in the support member 408 and yoke 404 may define an aperture for fluidic lens 402. The sides 410, 412 of the yoke 404 may be configured to perform a similar function as that of band 104 (as described in the first embodiment and shown in FIG. 1). Specifically, when the yoke 404 rotates about an axis located at one end of the yoke, the sides 410, 412 may impinge on portions of the membrane 402 or another part of the fluidic lens that is external to the aperture (for example, portions of the membrane that may be occluded by opaque portions of the support member 406). Movement of sides 410, 412 results in an increase or decrease of forces exerted by sides 410, 412 on the membrane. This change in force on the membrane 402 or some other part of the fluidic lens may cause the displacement of fluid within the volume bounded partly by the membrane 402, thereby changing the curvature of the membrane 402 and focusing power of the fluidic lens.

To actuate the yoke 404, a slide member 414 may be provided. Slide member 414 may function in a fashion similar to that of the slide member or pin member and may include a knob member as described in the previous embodiments. An inclined slot 416 may be disposed in a portion of, or in communication with, the yoke 404. Slide member 414 may contact the support member 406 and an interior surface of inclined slot 416. Preferably, inclined slot 416 may be disposed in the side of yoke 404 farthest from the hinge 408. A movement (or sliding motion in parallel to or along a sliding axis or direct) of slide member 414 results in movement of yoke 404, a change in force on fluidic lens 402 and displacement of the fluid. In this fashion, moving the slide member may result in a change of focal power (or optical power) of the fluidic lens 402 or device.

Numerous variations of these embodiments are possible without departing from their essential inventive content. For instance, other well known mechanical devices may be employed to impinge on either the spherical or the lateral surfaces of the lens membrane. Likewise, reservoir compartments of various shapes and relative locations could be substituted with the same general effect. Furthermore, instead of manually adjusting the position of the yoke, slide or slide member, other well known mechanical actuators (such as piezoelectric actuators, piezoelectric ring benders, electroactive polymer, or motors) may be employed to actuate the device and control its focal power. Further, one or more of the optical surfaces (or membranes) may be at least partially transmissive, reflective (such as a mirror), diffractive, refractive, include gratings, holographic optical elements, optical coatings (such as antireflective coatings, highly reflective coatings, nanoscale coatings or anti-fog coatings).

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

What is claimed is:

1. A fluidic viewfinder device comprising
   a support member having an opening forming an aperture;
   a fluidic lens disposed at least partially in communication with the aperture and support member;
   wherein the fluidic lens comprises a first optical surface and a second optical surface;
   wherein one or more of the first optical surface or second optical surface includes an elastic membrane;
   wherein a fluid is enclosed in at least a portion of the fluidic lens;
   a band disposed in communication with the support member;
   wherein the band is disposed in communication with a portion of fluidic lens;
   a slide member coupled to the support member;
   wherein the slide member is configured to move parallel to a sliding axis;
   wherein movement of the slide along the direction parallel to the sliding axis results in a change in tension on the band;
   wherein the change in tension on the band communicates a change in force on the fluidic lens;
   wherein the change in force on the fluidic lens results in a displacement of the fluid, a deformation of the membrane, and a change in an optical property of the fluidic lens.

2. The device of claim 1 wherein the change in optical properties include a change of focal power.

3. The device of claim 1 wherein one or more of the optical surfaces are at least partially transparent, reflective or diffractive.

4. The device of claim 1 wherein the fluid is at least partially transparent.

5. The device of claim 1 wherein a first slot is disposed in a portion of the support member and a second slot is disposed in a portion of the slide member;
   wherein the first and second slots are in at least partial communication with each other;

wherein the first slot is disposed substantially parallel to the sliding axis; and wherein the first slot is disposed at an angle to the second slot.

6. The device of claim 5 further comprising a pin member configured to pass simultaneously through both the first slot and second slot.

7. The device of claim 6 wherein the pin member, first slot and second slot are configured such that movement of the pin member along the sliding axis causes the slide member to move with respect to the support member.

8. The device of claim 7 wherein frictional forces between two or more of the first slot, second slot, pin member, slide member or support member are sufficient to prevent the tension in the band from causing the pin member to move.

9. The device of claim 1 wherein at least a portion of the fluidic lens comprises a rectangular section of a curved shape.

10. The device of claim 1 wherein the second optical surface includes fixed optical element.

11. The device of claim 10 wherein at least a portion of the curved shape is generally spherical, aspherical or cylindrical.

12. A fluidic viewfinder device comprising
a support member having an opening forming an aperture;
a fluidic lens disposed at least partially in communication with the aperture and support member;
wherein the fluidic lens comprises a first optical surface and a second optical surface;
wherein one or more of the first optical surface or second optical surface includes an elastic membrane;
wherein a fluid is enclosed in at least a portion of the fluidic lens;
wherein the fluidic lens includes a main fluid compartment and a reservoir compartment;
wherein the main fluid compartment is in communication with the reservoir compartment;
a slide member coupled to the support member and in communication with the one or more of the fluidic lens or reservoir compartment;
wherein the slide member is configured to move in a direction parallel to a sliding axis;
wherein movement of the slide member along the direction parallel to the sliding axis results in a displacement of fluid in the reservoir compartment and a displacement of fluid in the main fluid compartment;
wherein the displacement of fluid in the main fluid compartment causes a deformation of the membrane, and a change in an optical property of the fluidic lens;
wherein a portion of the slide member is configured to impinge on one or more of the compliant walls.

13. The device of claim 12 wherein the reservoir compartment is in fluid communication with the main fluid compartment.

14. The device of claim 12 wherein one or more of the reservoir compartment or main fluid compartment includes one or more compliant walls.

15. The device of claim 12 wherein at least a portion of the fluidic lens comprises a rectangular section of a curved shape.

16. The device of claim 15 wherein at least a portion of the curved shape is generally spherical, aspherical or cylindrical.

17. The device of claim 12 wherein the second optical surface includes fixed optical element.

18. A fluidic viewfinder device comprising
a support member having an opening forming an aperture;
a fluidic lens disposed at least partially in communication with the aperture and support member;
wherein the fluidic lens comprises a first optical surface and a second optical surface;
wherein one or more of the first optical surface or second optical surface includes an elastic membrane;
wherein a fluid is enclosed in at least a portion of the fluidic lens;
wherein the fluidic lens includes a main fluid compartment and a reservoir compartment;
wherein the main fluid compartment is in communication with the reservoir compartment;
a slide member coupled to the support member and in communication with the one or more of the fluidic lens or reservoir compartment;
wherein the slide member is configured to move in a direction parallel to a sliding axis;
wherein movement of the slide member along the direction parallel to the sliding axis results in a displacement of fluid in the reservoir compartment and a displacement of fluid in the main fluid compartment;
wherein the displacement of fluid in the main fluid compartment causes a deformation of the membrane and a change in an optical property of the fluidic lens;
wherein a first slot is disposed in a portion of the support member and a second slot is disposed in a portion of the slide member;
wherein the first and second slots are in at least partial communication with each other;
wherein the first slot is disposed substantially parallel to the sliding axis; and
wherein the first slot is disposed at an angle to the second slot.

19. The device of claim 18 further comprising a pin member configured to pass simultaneously through both the first slot and second slot.

20. The device of claim 19 wherein the pin member, first slot and second slot are configured such that movement of the pin member along the sliding axis causes the slide member to move with respect to the support member.

21. A fluidic viewfinder device comprising
a support member having an opening forming an aperture;
a fluidic lens disposed at least partially in communication with the aperture and support member;
wherein the fluidic lens comprises a first optical surface and a second optical surface;
wherein one or more of the first optical surface or second optical surface includes an elastic membrane;
wherein a fluid is enclosed in at least a portion of the fluidic lens;
a yoke having an opening forming an aperture and disposed in communication with the fluidic lens;
wherein the yoke is adapted for rotation about an axis of rotation proximate a first end of the yoke;
wherein the yoke includes an opening in communication with the aperture;
wherein the rotation of the yoke results in an impingement on one or more of the membrane or fluidic lens;
wherein the impingement results in a displacement of the fluid, a deformation of the membrane and a change in an optical property of the fluidic lens;
wherein the device further comprises a slide member disposed in communication with one or more of the yoke or support member;
wherein a movement of the slide member results in the impingement.

22. The device of claim 21 wherein the yoke includes an inclined slot located at a second end of the yoke;

wherein the second end of the yoke is distal to the first end of the yoke.

* * * * *